(12) United States Patent
Matsumoto

(10) Patent No.: US 6,520,679 B2
(45) Date of Patent: Feb. 18, 2003

(54) ROLLING GUIDE APPARATUS (75) Inventor: Jun Matsumoto, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/885,502

(22) Filed: Jun. 20, 2001

(65) Prior Publication Data

US 2001/0054238 A1 Dec. 27, 2001

(30) Foreign Application Priority Data

Jun. 23, 2000 (JP) ........................................ 2000-189977

(51) Int. Cl.$^7$ ............................................... F16C 29/00
(52) U.S. Cl. ........................................................ 384/45
(58) Field of Search ............................ 384/45, 44, 43; 464/168

(56) References Cited

U.S. PATENT DOCUMENTS 4,502,737 A * 3/1985 Osawa ........................ 384/45
4,664,535 A * 5/1987 Mottate ....................... 384/45
5,957,586 A * 9/1999 Okamoto et al. ............. 384/45

* cited by examiner

Primary Examiner—Lenard A. Footland
(74) Attorney, Agent, or Firm—Christensen O'Connor Johnson Kindness PLLC (57) ABSTRACT A rolling guide apparatus comprises a first slide member and second slide member. The first slide member includes a pair of wing portions and a connecting portion connecting the wing portions. First raceway grooves are formed on the wing portions, individually. Second raceway grooves are formed on the second slide member. Rolling elements are held under a pre-load between the raceway grooves. A residual compression stress region is created on the surface region of the first slide member. A worked portion is formed on the connecting portion. The worked portion serves to adjust the pre-load on the rolling elements by regulating the residual compression stress region by working to deform the connecting portion.

4 Claims, 6 Drawing Sheets

ROLLING GUIDE APPARATUS

CROSS-REFERENCE TO RELATED APPLICATIONS

This application is based upon and claims the benefit of priority from the prior Japanese Patent Application No. 2000-189977, field Jun. 23, 2000, the entire contents of which are incorporated herein by reference.

BACKGROUND OF THE INVENTION

The present invention relates to a rolling guide apparatus, such as a linear guide apparatus or circular guide apparatus.

A rolling guide apparatus comprises a first slide member including a pair of wing portions opposed to each other and a second slide member capable of moving relatively to the first slide member. A plurality of rolling elements, such as balls, are held between the wing portions of the first slide member and the second slide member.

For example, a linear guide apparatus includes a carriage as an example of the first slide member and a rail as an example of the second slide member. The carriage can relatively move in the axial direction longitudinal direction) of the rail. The carriage includes the pair of wing portions and a connecting portion that connects the wing portions. First raceway grooves are formed individually on the respective inner surfaces of the wing portions. Second raceway grooves corresponding in position to the first raceway grooves are formed individually on the opposite side faces of the rail. Further, the carriage is formed having return ways that are continuous with the first raceway grooves, individually. The return ways and the first and second raceway grooves constitute an endless circulation way. The balls as the rolling elements are held in the circulation way.

In order to enhance the stiffness of the rolling guide apparatus described above, the rolling elements are held under a pre-load between the first and second slide members. Conventionally, the pre-load is adjusted by selecting the size of rolling elements. More specifically, a lot of types of rolling elements with different diameters are prepared, and rolling elements with a suitable diameter are selected and incorporated into the rolling guide apparatus so that a desired pre-load is applied to the rolling elements. In general, the diameters of available rolling elements are graduated in micrometers.

Since the aforesaid conventional pre-load adjusting means involves preparation of a lot of types of rolling elements, its management takes much labor. Moreover, the range of dimensions of the available rolling elements is limited, so that the adjustable pre-load level is inevitably restricted.

BRIEF SUMMARY OF THE INVENTION

Accordingly, the object of the present invention is to provide a rolling guide apparatus capable of easily adjusting a pre-load without being provided with many types of rolling elements with different diameters.

A rolling guide apparatus according to the present invention comprises: a first slide member including a pair of wing portions and a connecting portion connecting the wing portions and formed having first raceway grooves on the wing portions, individually; a second slide member combined with the first slide member, movable relatively to the first slide member, and formed having second raceway grooves corresponding in position to the first raceway grooves, individually; rolling elements held between the first and second raceway grooves; a residual compression stress region created on the surface region of the first slide member; and a worked portion formed on the residual compression stress region on an inner or outer surface of the connecting portion and capable of deforming the connecting portion as the residual compression stress region is worked and adjusting a pre-load on the rolling elements in accordance with the deformation.

According to this invention, the pre-load on the rolling elements can be adjusted to a desired value by simply forming the worked portion on the first slide member without preparing many types of rolling elements with different diameters that are required by conventional apparatuses.

Preferably, the process for forming the worked portion is carried out with the first and second slide members combined with each other. According to this invention, the pre-load can be adjusted without the trouble of disassembling or reassembling the first and second slide members.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to FIGS. 1 to 4.

Figure 1:
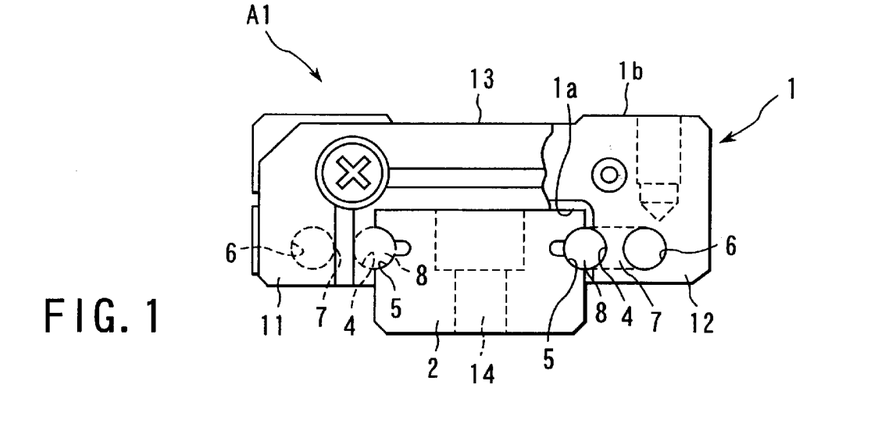
FIG. 1 is a cutaway front view of a rolling guide apparatus according to a first embodiment of the present invention.
Figure 2:
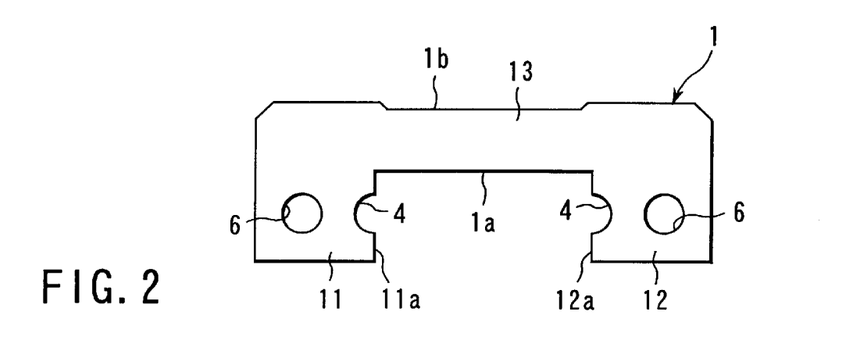
FIG. 2 is a front view of a first slide member used in the rolling guide apparatus shown in FIG. 1.

A rolling guide apparatus A1 shown in FIG. 1 comprises a carriage as an example of a first slide member 1 and a rail as an example of a second slide member 2. As shown in FIG. 2, the first slide member 1 is provided with a pair of wing portions 11 and 12 and a connecting portion 13 that connects the wing portions 11 and 12. Inner surfaces 11a and 12a of the wing portions 11 and 12 are opposed to each other. A second slide member 2 is interposed between the wing portions 11 and 12. The second slide member 2 is penetrated by a mounting hole 14 that extends in its thickness direction.

First raceway grooves 4 that extend in the axial direction of the slide member 1 are formed individually on the inner surfaces 11a and 12a of the wing portions 11 and 12. Second raceway grooves 5 corresponding in position to the first raceway grooves 4 are formed individually on the opposite side faces of the second slide member 2. The first slide member 1 is formed having return ways 6 that are continuous with the first raceway grooves 4, individually. The return ways 6 and the raceway grooves 4 and 5 constitute an endless circulation way 7. A large number of rolling elements 8, such as steel balls, are held in the circulation way 7.

When the first and second slide members 1 and 2 relatively move in the axial direction, the rolling elements 8 between the raceway grooves 4 and 5 roll as they endlessly circulate in the circulation way 7. As the rolling elements 8 endlessly circulate in this manner, the first slide member 1 can smoothly move with respect to the second slide member 2.

In the rolling guide apparatus A1, the rolling elements 8 are subjected to a pre-load as they are elastically deformed between the raceway grooves 4 and 5. In general, there is a fixed relation between the dynamic frictional force of the rolling guide apparatus and the pre-load. It is known that the higher the preload, the greater the dynamic frictional force is.

Figure 3:
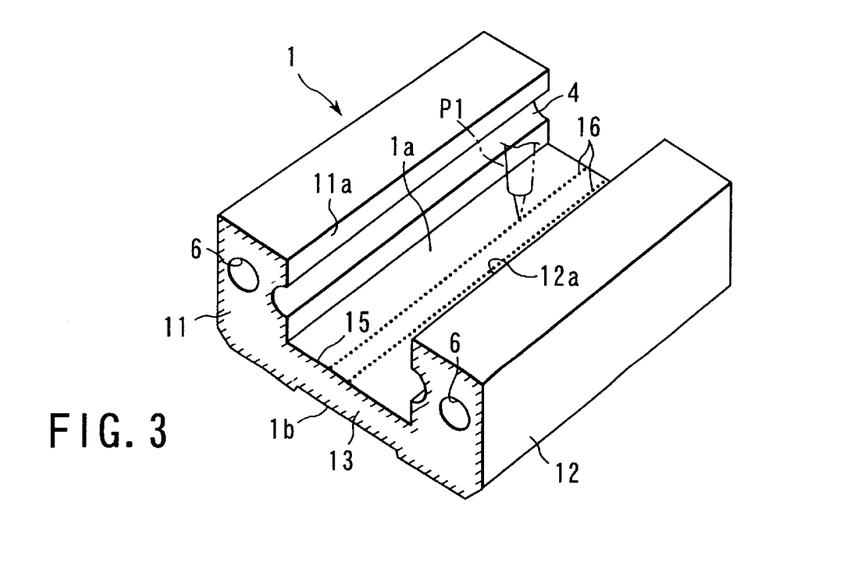
FIG. 3 is a perspective view of the first slide member shown in FIG. 2.

As indicated by hatching in FIG. 3 for ease of illustration, there is a residual compression stress region 15 on the surface region of the first slide member 1. The residual compression stress region 15 is formed of a metal structure that is impregnated with residual compression stress by plastic working such as drawing or shot-peening, heat treatment such as quenching or tempering, or some other mechanical or chemical treatment that is carried out in a manufacturing process for the slide member 1.

As shown in FIG. 3, worked portions 16, which extend in the axial direction of the slide member 1, are formed on an inner surface 1a of the connecting portion 13 that is continuous with the respective inner surfaces 11a and 12a of the wing portions 11 and 12. The worked portions 16 are formed in a manner such that a large number of fine dimples are continuously formed on the inner surface 1a by using a vibration pen P1, for example. The vibration pen P1 is a tool in which a pen point of ultra-steel or the like is vibrated by means of pneumatic pressure or the like to prick a large number of fine dimples on the surface of metal, whereby characters, lines, etc. can be inscribed on the metal surface.

Figure 4:
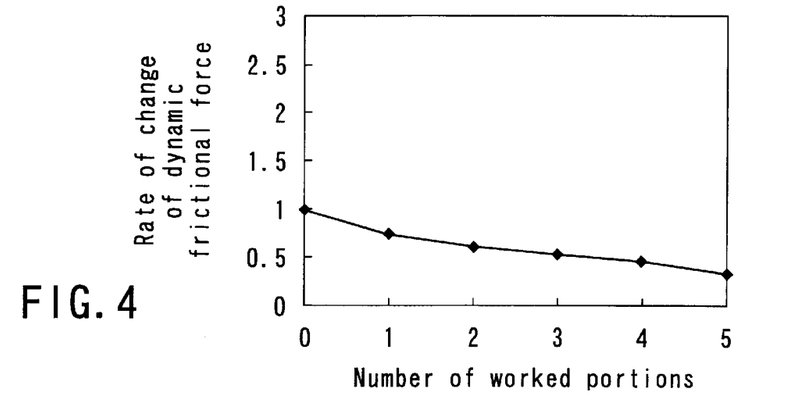
FIG. 4 is a diagram showing the relation between the number of worked portions of the slide member shown in FIG. 2 and the dynamic frictional force of the rolling guide apparatus.

FIG. 4 shows results of determination of the relation between the number of worked portions 16 and the dynamic frictional force of the rolling guide apparatus A1 established when the worked portions 16 were formed on the inner surface 1a of the slide member 1. It was found, as shown in FIG. 4, that the dynamic frictional force of the rolling guide apparatus A1 changes when the worked portions 16 are formed on the inner surface 1a of the slide member 1. It was also found that the dynamic frictional force decreases in inverse proportion to the number of worked portions 16. Thus, the pre-load on the rolling elements 8 can be adjusted in accordance with the number of worked portions 16.

Figure 5:
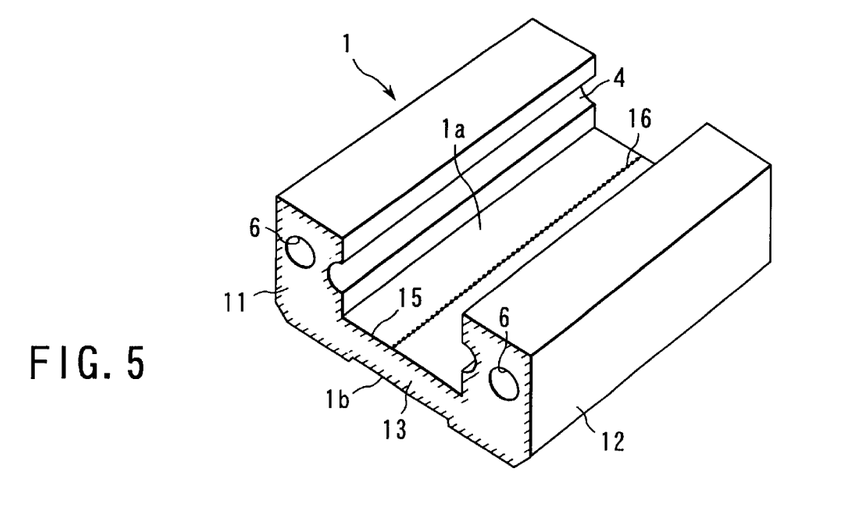
FIG. 5 is a perspective view of a slide member according to a second embodiment of the invention.
Figure 6:
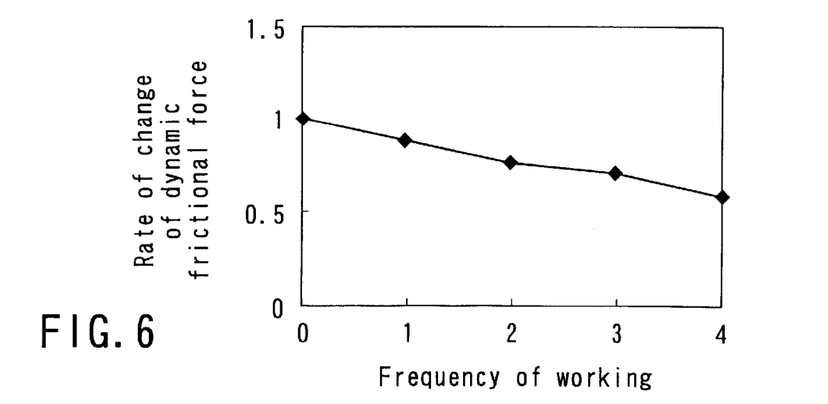
FIG. 6 is a diagram showing the relation between the frequency of working on a worked portion of the slide member shown in FIG. 5 and the dynamic frictional force of the rolling guide apparatus.

FIG. 5 shows a slide member 1 according to a second embodiment of the invention. Only one worked portion 16 is formed on an inner surface 1a of the slide member 1 by using a vibration pen. The worked portion 16 also extends substantially in a straight line in the axial direction of the slide member 1. FIG. 6 shows results of determination of the relation between the frequency of working and the dynamic frictional force of the rolling guide apparatus A1 according to the second embodiment established when the worked portion 16 was worked a plurality of times. As seen from FIG. 6, the dynamic frictional force decreases in inverse proportion to the frequency of working for the worked portion 16, and a pre-load on rolling elements 8 can be adjusted in accordance with the frequency of working.

Figure 7:
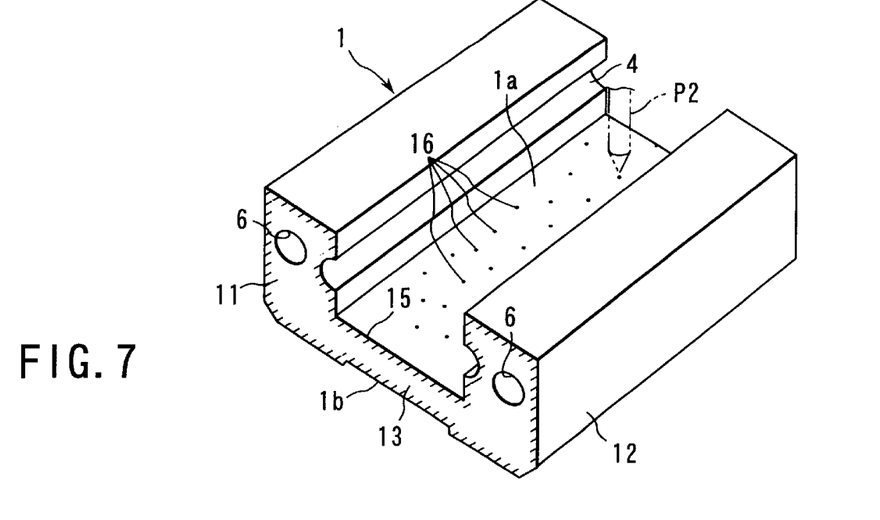
FIG. 7 is a perspective view of a slide member according to a third embodiment of the invention.
Figure 8:
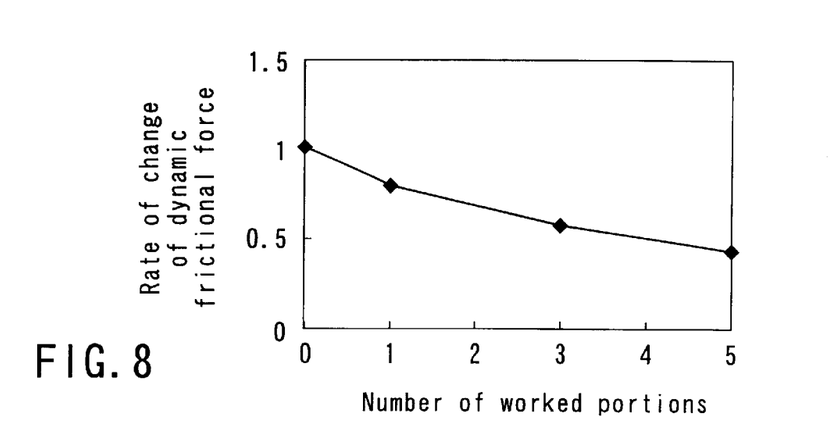
FIG. 8 is a diagram showing the relation between the number of worked portions of the slide member shown in FIG. 7 and the dynamic frictional force of the rolling guide apparatus.

FIG. 7 shows a slide member 1 according to a third embodiment of the invention. As an example of plastic working, in this embodiment, worked portions 16 or impressions are formed on an inner surface 1a of the slide member 1 by using a punch P2. FIG. 8 shows the relation between the number of worked portions 16 and the dynamic frictional force of the rolling guide apparatus A1. It was found, as shown in FIG. 8, that the dynamic frictional force decreases in inverse proportion to the number of worked portions 16, and that a pre-load on rolling elements 8 can be adjusted in accordance with the number of worked portions 16.

Figure 9:
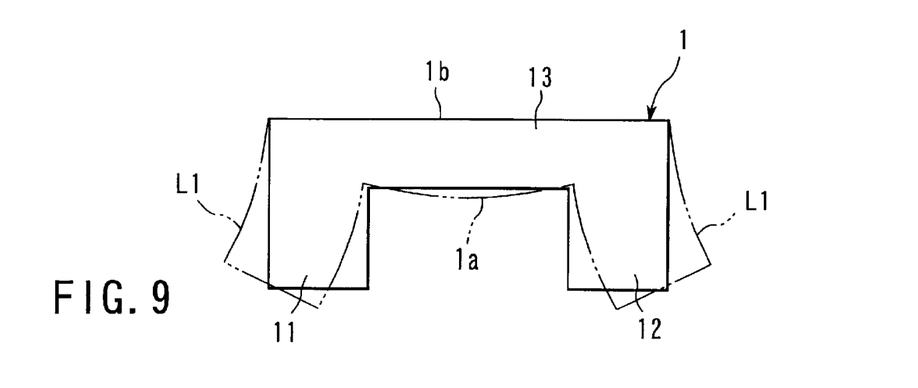
FIG. 9 is a front view schematically showing the way the slide member of any of the foregoing embodiments is deformed.

If the worked portions 16 are formed on the inner surface 1a of the slide member 1 by plastic working or the like, as in the cases of the first to third embodiments, the inner surface 1a of the connecting portion 13 is deformed in a direction such that the distance between the wing portions 11 and 12 lengthens, as indicated by two-dot chain line L1 in FIG. 9. The reason is that the formation of the worked portion(s) 16 on the inner surface 1a of the connecting portion 13 changes the condition of the residual compression stress region 15 on the inner surface 1a, thereby stretching the inner surface side.

Figure 10:
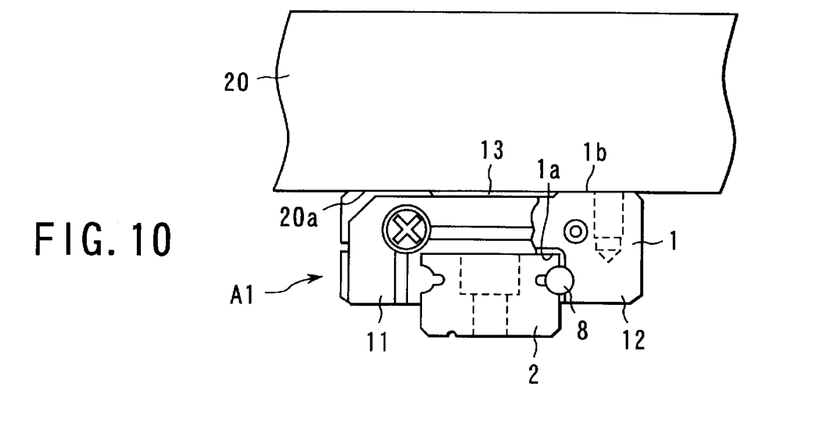
FIG. 10 is a front view showing the way the rolling guide apparatus shown in FIG. 1 is fixed to a support member.

When the rolling guide apparatus A1 is actually used, the slide member 1 is fixed to a support member 20 by means of bolts or the like, as shown in FIG. 10. The support member 20 is thicker enough than the slide member 1. Normally, moreover, a surface 20a of the support member 20 that is in contact with the slide member 1 is flat.

Figure 11:
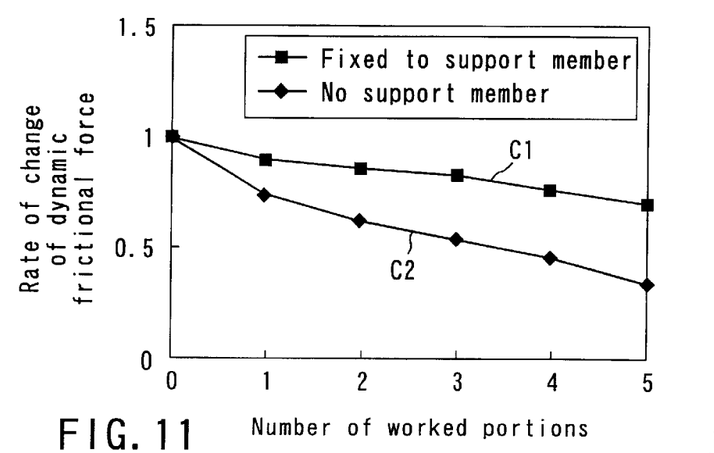
FIG. 11 is a diagram showing dynamic frictional forces for the cases where the rolling guide apparatus using the slide member shown in FIG. 3 is and is not fixed to the support member.

FIG. 11 shows results of determination of the relation between the number of worked portions 16 and the dynamic frictional force for each of the cases where the slide member 1 shown in FIG. 3 is and is not fixed to the support member 20. In FIG. 11, a curve C1 represents the case where the slide member 1 is fixed to the support member 20, while a curve C2 represents the case where the slide member 1 is hot fixed to the support member 20. In the case where the slide member 1 is fixed to the support member 20, as seen from FIG. 11, a satisfactory effect for pre-load adjustment can be maintained, although it is somewhat lower than in the case where the slide member 1 is not fixed to the support member 20.

Figure 12:
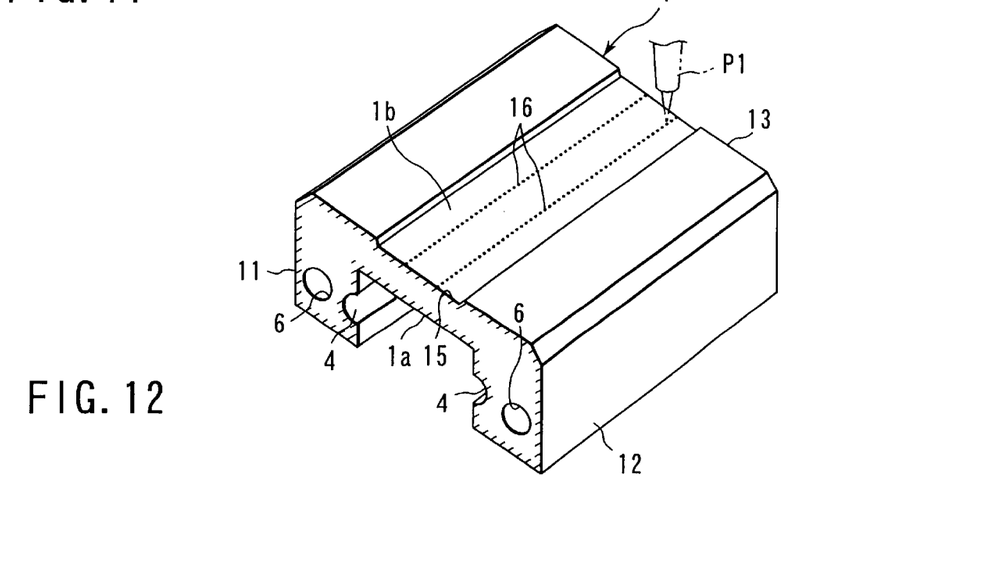
FIG. 12 is a perspective view of a slide member according to a fourth embodiment of the invention.
Figure 13:
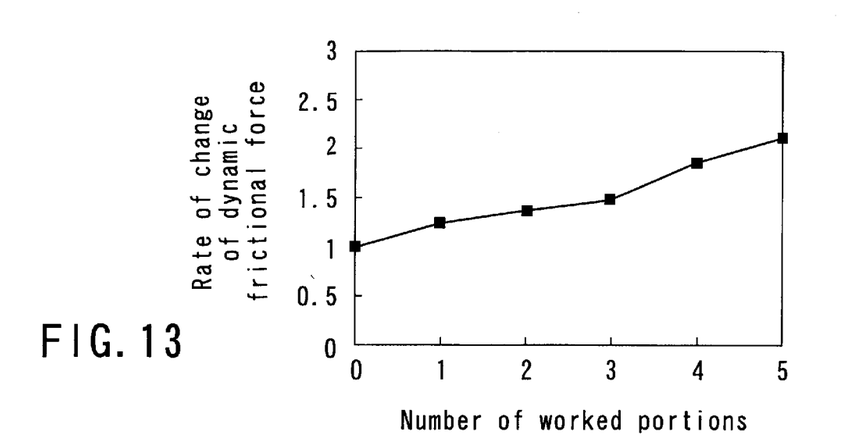
FIG. 13 is a diagram showing the relation between the number of worked portions of the, slide member shown in FIG. 12 and the dynamic frictional force of the rolling guide apparatus.

FIG. 12 shows a slide member 1 according to a fourth embodiment of the invention. In this embodiment, worked portions 16 are formed on an outer surface 1b of a connecting portion 13. FIG. 13 shows results of determination of the relation between the number of worked portions 16 and the dynamic frictional force of the rolling guide apparatus A1 for the case where a plurality of worked portions 16 are formed on the outer surface 1b by using a vibration pen.

Figure 14:
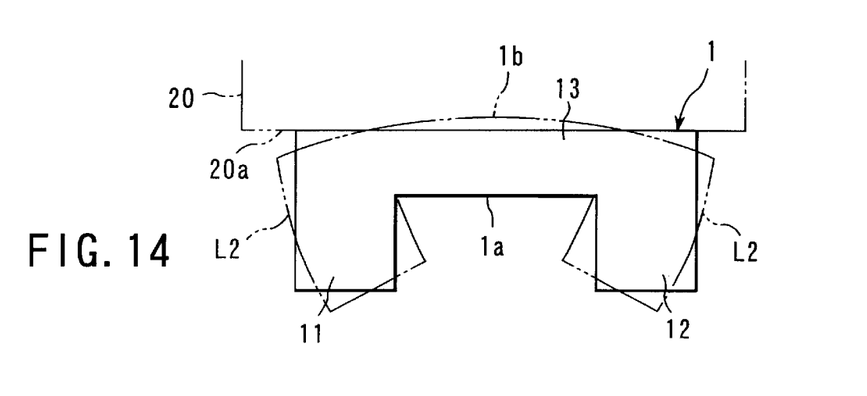
FIG. 14 is a front view schematically showing the way the slide member shown in FIG. 12 is deformed.

It was found, as shown in FIG. 13, that the dynamic frictional force of the rolling guide apparatus A1 also changes when the worked portions 16 are formed on the outer surface 1b of the slide member 1. It was also found that the dynamic frictional force (or pre-load) increases in proportion to the number of worked portions 16. In the case of this embodiment, the formation of the worked portions 16 changes condition of a residual compression stress region 15 on the outer surface 1b, thereby stretching the outer surface side and shortening the distance between wing portions 11 and 12, as indicated by two-dot chain line L2 in FIG. 14.

If the worked portions 16 are formed on the outer surface 1b of the slide member 1, as in the case of the fourth embodiment, the outer surface 1b sometimes may be deformed relatively greatly, depending on the position of the worked portions 16 or the working method. A support member 20 is thicker enough than the slide member 1, and its surface 20a that is in contact with the slide member 1 is flat. When the slide member 1 is fixed to the support member 20, therefore, the outer surface 1b having so far been deformed is reformed into a substantially flat shape by means of the support member 20. Thus, the pre-load adjustment effect of the worked portions 16 cannot be maintained.

Figure 15:
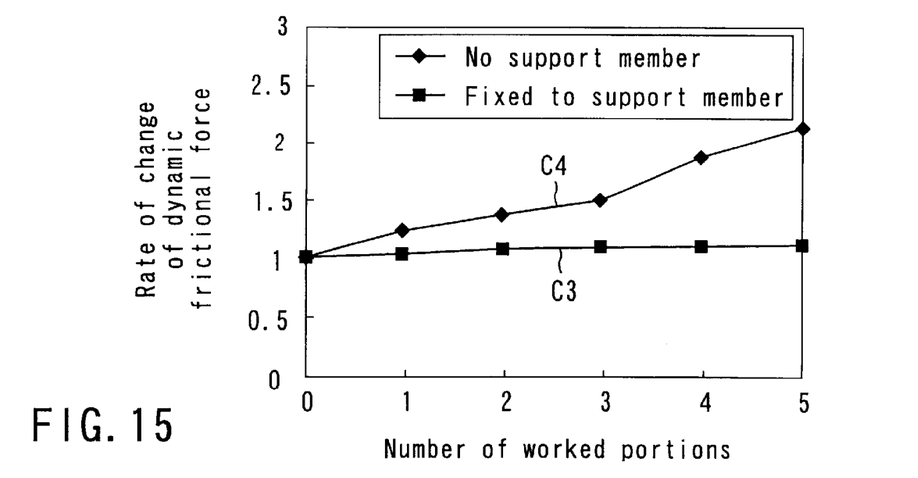
FIG. 15 is a diagram showing dynamic frictional forces for the cases where the rolling guide apparatus using the slide member shown in FIG. 12 is and is not fixed to the support member.

FIG. 15 shows results of determination of the relation between the number of worked portions 16 and the dynamic frictional force for each of the cases where the slide member 1 shown in FIG. 12 is and is not fixed to the support member 20. In FIG. 15, a curve C3 represents the case where the slide member 1 is fixed to the support member 20, while a curve C4 represents the case where the slide member 1 is not fixed to the support member 20. In the case where the slide member 1 is fixed to the support member 20, as seen from FIG. 15, there is hardly any effect for pre-load adjustment.

In the fourth embodiment, therefore, it is advisable to form flat worked portions on the outer surface 1b of the slide member 1 by cutting or grinding. In this case, residual stress in the residual compression stress region 15 on the outer surface 1b varies depending on the volume of cuttings of the region 15, accordingly the distance between the wing portions 11 and 12 can be adjusted. The pre-load adjustment effect can be maintained by fixing the outer surface 1b, thus flattened, to the support member 20.

In order to determine the level of the pre-load on the rolling elements 8, the dynamic frictional force of the rolling guide apparatus A1 must be measured with the slide members 1 and 2 assembled together. If the worked portions 16 are formed with the one slide member 1 off the other slide member 2, therefore, assembly and disassembly of the slide members 1 and 2 must be repeated several times to adjust the pre-load to a desired level.

It is advisable, therefore, to form the worked portions 16 on the inner or outer surface 1a or 1b with the slide members 1 and 2 combined with each other. In forming the worked portions 16 on the inner surface 1a, the inner surface 1a can be worked by means of a vibration pen or punch that is inserted through a mounting hole 14 (shown in FIG. 1) in the other slide member 2. If the pre-load is adjusted with the slide members 1 and 2 combined in this manner, it can be measured as the worked portions 16 are worked without assembling or disassembling the slide members 1 and 2.

Figures 16, 17:
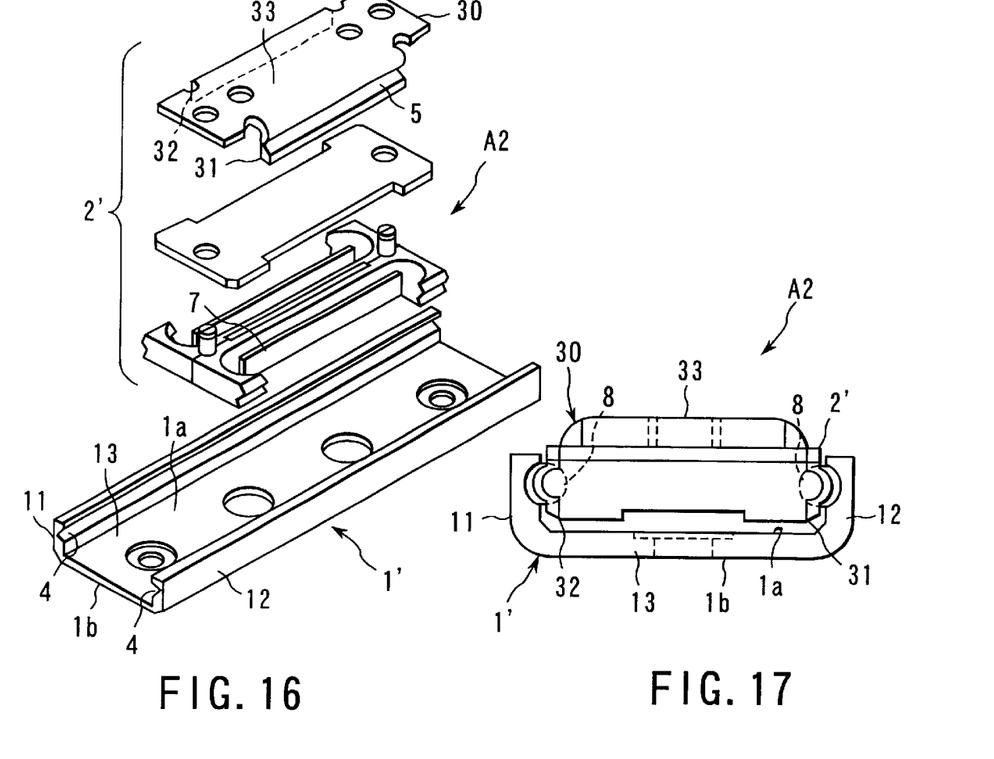
FIG. 16 is a exploded perspective view of a rolling guide apparatus according to a fifth embodiment ,of the invention.
FIG. 17 is a front view of the rolling guide apparatus shown in FIG. 16.

FIGS. 16 and 17 show a rolling guide apparatus A2 according to a fifth embodiment of the invention. This apparatus A2 is provided with a rail 1' for use as a first slide member that includes a pair of wing portions 11 and 12. Raceway grooves 4 are formed on the inner surfaces of the wing portions 11 and 12, individually. A carriage 2' for use as a second slide member that is provided with a bearing 30 is interposed between the wing portions 11 and 12. The carriage 2' is provided with a pair of wing portions 31 and 32 and a connecting portion 33. The carriage 2' is formed having second raceway grooves 5 and a circulation way 7. Rolling elements 8 held in the circulation way 7 endlessly circulate in the circulation way 7 as the rail 1' and the carriage 2' move relatively to each other. These elements are constructed in a conventional manner.

In the case of the fifth embodiment, a residual compression stress region is formed oh the respective surface regions of the rail 1', bearing 30, etc. The rolling guide apparatus A2 of the fifth embodiment is quite different from conventional rolling guide apparatuses in that worked portions are formed on an inner or outer surface 1a or 1b of a connecting portion 13. A pre-load on the rolling elements 8 is adjusted in a manner such that the condition of the residual compression stress region is changed to vary the distance between the wing portions 11 and 12 by means of the worked portions. In this fifth embodiment, it is also advisable to form the worked portions with the rail 1' and the carriage 2' combined with each other as the pre-load is adjusted. By doing this, the pre-load can be adjusted to its optimum value without assembling or disassembling the rail 1' and the carriage 2'. In the fifth embodiment, the worked portions may be formed on the connecting portion 33 of the bearing 30 of the carrige 2'. Since the bearing 30 is shorter than the rail 1', in this case, it is easier to form the worked portions and adjust the pre-load. In this arrangement, the carriage 2' and the rail 1' serve as the first and second slide members according to the present invention, respectively.

Figure 18:
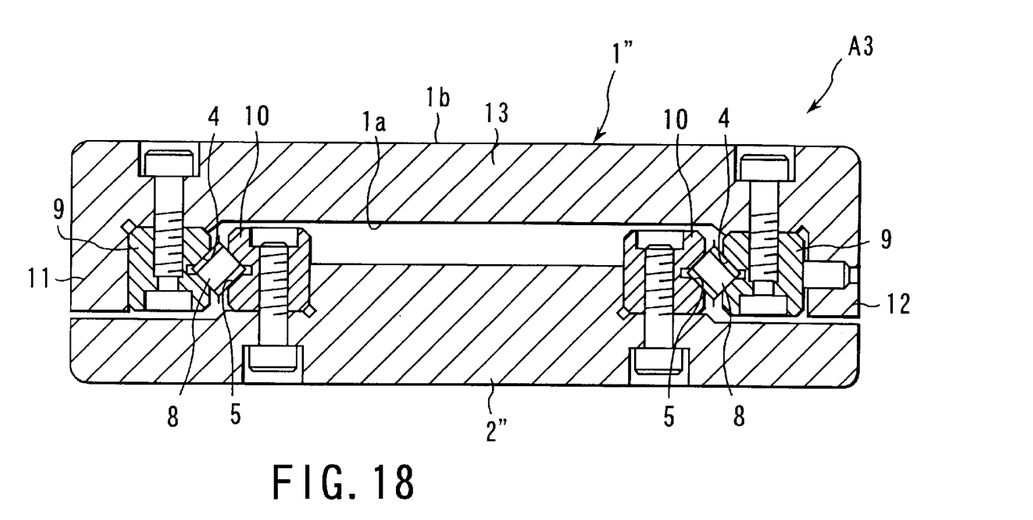
FIG. 18 is a sectional view of a rolling guide apparatus according to a sixth embodiment of the invention.

FIG. 18 shows a rolling guide apparatus A3 according to a sixth embodiment of the invention. In the case of this apparatus A3, a carriage 1" for use as a first slide member makes a linear motion relative to rail 2" for use as a second slide member. A pair of wing portions 11 and 12 are formed individually along the opposite side edges of the carriage 1" that has a substantially rectangular plane shape. The rail 2" is interposed between the wing portions 11 and 12.

The carriage 1" and the rail 2" are provided with raceway members 9 and 10, respectively. Rolling elements 8 or rollers are arranged between raceway grooves 4 and 5 that are formed on the raceway members 9 and 10, respectively. The rolling elements 8 are alternately inclined so that the respective central axes of each two of them extend at right angles to each other. As the carriage 1" and the rail 2" move relatively to each other, the rolling elements 8 roll between the raceway members 9 and 10. These elements are constructed in a conventional manner.

However, the rolling guide apparatus A3 of the sixth embodiment is quite different from conventional ones in that a residual compression stress region and worked portions are formed on a connecting portion 13 of the carriage 1" and that a pre-load on the rolling elements 8 is adjusted by changing the distance between the wing portions 11 and 12 in accordance with the worked portions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rolling guide apparatus comprising:
    a first slide member including a pair of wing portions and a connecting portion connecting the wing portions and formed having first raceway grooves on the wing portions, individually;
    a second slide member combined with the first slide member, movable relatively to the first slide member, and formed having second raceway grooves corresponding in position to the first raceway grooves, individually;
    rolling elements held between the first and second raceway grooves;
    a residual compression stress region created on the surface region of the first slide member; and
    a worked portion formed on the residual compression stress region on an inner surface of the connecting portion and capable of deforming the connecting portion as the residual compression stress region is worked and adjusting a pre-load on the rolling elements in accordance with the deformation.

2. A rolling guide apparatus according to claim 1, wherein said worked portion is obtained by plastically deforming a part of the inner surface of the first slide member or removing a part of the material of the inner surface.

3. A rolling guide apparatus according to claim 1, wherein said residual compression stress region is formed of a metal structure impregnated with residual stress by heat treatment, plastic working, or chemical treatment.

4. A rolling guide apparatus comprising:
    a first slide member including a pair of wing portions and a connecting portion connecting the wing portions and formed having first raceway grooves on the wing portions, individually;
    a second slide member combined with the first slide member, movable relatively to the first slide member, and formed having second raceway grooves corresponding in position to the first raceway grooves, individually;
    rolling elements held between the first and second raceway grooves;
    a residual compression stress region created on the surface region of the first slide member; and
    a worked portion formed on an inner surface of the connecting portion.

* * * * *